United States Patent Office  3,761,433
Patented Sept. 25, 1973

3,761,433
COMPOSITION AND METHOD OF COATING OILY SURFACES WITH WATER REDUCIBLE PAINT
Gerald Stanfield High, Detroit, Mich., assignor to The Sherwin-Williams Company, Cleveland, Ohio
No Drawing. Filed Sept. 1, 1971, Ser. No. 177,137
Int. Cl. C09d 3/48, 5/02
U.S. Cl. 260—22 A     21 Claims

ABSTRACT OF THE DISCLOSURE

A method of coating oily surfaces with water reducible paint and a new coating composition which includes a water reducible resin vehicle and a special additive material included in the composition for effecting an adherent coating on said oily surfaces.

BACKGROUND OF THE INVENTION

This invention broadly relates to a new composition and method. More particularly, the invention relates to a new coating composition and method for coating oily or grease containing surfaces.

In the past new automobile engines have been coated with a solvent-oil based paint composition or engine enamel after the still hot engines were removed from a post-assembly test stand where the engines are started and ran at high r.p.m. These engines prior to being painted possessed an exterior oily surface resulting from the lubricating fluids used in the engine during their testing operation. This exterior oily surface on the engines made their subsequent painting difficult in the past and the oil based paint led to certain pollution control problems, thus a water based paint would have been considered desirable, but such was not known to be possible because of the incompatibility between water and oil. Moreover water based paints known in the prior art have been found unsatisfactory in attempts to solve the above problem.

Accordingly, one object of this invention is to provide a solution to the above problem by way of providing a method of coating oily surfaces with water reducible paint composition to provide a coating which has highly satisfactory film properties as observed after application of the coating over oily surfaces.

Another object of the present invention is to provide a new composition.

Another object of the present invention is to provide a new composition suitable for use in forming paint coatings over oily surfaces, and which composition contains a special additive material to enable the accomplishment of this object.

Another object of the present invention is to provide a new water based coating composition having a basic pH above 7.5 and including a special additive material and a water reducible resin vehicle.

Another object of the present invention involves in a water based coating composition which includes a water reducible resin vehicle and water, the provision of the improvement of including in the composition a special additive material means operative to enable said composition to be adherently applied over oily and/or greasy substrate surfaces.

Another object of the present invention is to provide a method of coating oily surfaces with a water based coating composition wherein it is possible to apply the coating composition to an oily substrate surface which possesses an elevated temperature up to as high as about 95° C.

Other object, features, and advantages of the present invention will become apparent from the subsequent description and the appended claims.

The state of the art is indicated by the following references here made of record which were developed in a preliminary examination: Frevel et al. 2,691,684; Bowman 2,976,328; Bernardi et al. 2,991,184; Aguadisch 3,218,359; Peiser et al. 3,376,252; and Makowski et al. 3,439,604.

SUMMARY OF THE INVENTION

It has been discovered that a special additive material can be incorporated in a water based coating composition which includes a water reducible resin vehicle and water, and this additive has been found to cooperate with the coating composition in a manner operative to enable the coating composition to be adherently applied over oily substrate surfaces. Suffice it to say that, while the additive material which has been found to be workable in effecting this invention will be described in more detail below, the results obtained with this new coating composition are highly satisfactory. Particularly it has been found that the invention makes it possible to coat oily surfaces with water reducible paint to form a coating which has very good film properties, and the invention is specially suitable and advantageous for painting passenger vehicle engines and struck engines which are at an elevated temperature of approximately 75–95° C. and which possess an oily surface when said engines are removed from factory test stand operations.

In one aspect, briefly stated, the present invention involves in a water based coating composition, for coating oily substrate surfaces, including a water reducible resin vehicle and water, the improvement comprising inclusion of an additive material means of at least one $C_3$–$C_{11}$ rheological additive compound for altering relative surface tension characteristics present in the water based coating composition and oily material as the coating is applied to the substrate to displace the oily material and operative to enable said coating composition to be adherently applied to the substrate surface.

DESCRIPTION OF PREFERRED EMBODIMENTS

The composition of this invention normally intended for use as a water based paint and the composition may be pigmented or unpigmented, but normally for example it would be applied as a pigmented engine paint of color red or blue, etc.

The additive material discovered for use in the invention is one which is operative to enable the coating composition to be adherently applied over oily and greasy substrate surfaces. While it is not intended to base the invention on any particular theory of operation, it is believed that this additive material means operates as a rheological additive which for some unexplained reason appears to be capable of altering the relative surface tension characteristics present in the oily material and in the water based coating composition as it is applied over the substrate surface (which has the oily material thereon) such that the oily material is displaced and the inventive composition is enabled to become adherently applied to the underlying substrate surface. The additive material herein can be characterized as a $C_3$–$C_{11}$ polyalkoxy compound, and more particularly the additive can be characterized as a compound comprised of $C_4$–$C_8$ polyalkoxy compound material. Such additive materials can be selected from at least one of the group consisting of dimethoxymethane; 1,1,3-trimethoxy-3-ethoxypropane; 1,1,3-trimethoxypropene; 1,1,3-trimethoxypropane; 1,1-dimethoxytrimethylamine; 1,3,3-trimethoxypropene; methyl dimethoxyacetate; 2,2-diallyloxypropane; 2,2-diethoxypropane; 1,1,3,3-tetraethoxypropane; 4,4-dimethoxy-2-butanone; 1,2-dimethxyethane; 1,1-dimethoxyethane; and 2,2-dimethoxypropane. On a preferred basis the additive material should be selected from at least one of the group consisting of 1,1,3-trimethoxypropane; methyl dimethoxyacetate; 2,2-diethoxypropane; and 2,2-dimethoxypropane.

A particularly suitable additive for carrying out the invention is 2,2-dimethoxypropane.

The amount of the additive material used in the composition of the invention should be within the range of about 0.05% to about 5% by weight of a composition, and preferably the additive should be maintained within the range of about 0.1% to about 1.5% by weight of the composition.

The water reducible resin vehicle for use in the composition of this invention may be selected from a large number of different such resin vehicles. For example, as is disclosed herein the water reducible resin vehicle may be selected from at least one or more of the group consisting of an acrylic resin, polyester resin, vinyl resin, amino resin, epoxy resin, modified oil resin, latex resin, nitrile resin, phenolic resin, and polycarboxylic acid resin. Such water reducible resin vehicles are known in the paint art, and the same are exemplified in the disclosures of U.S. Pats. 2,634,245; 2,941,968; 2,981,703; 2,992,197; 3,030,321; 3,067,158; 3,230,162; 3,251,790 3,300,424; 3,351,675; 3,364,162; and 3,366,563. The disclosures of these references are incorporated herein by reference and are typical of water based paint compositions or water based coating compositions which utilize individual or mixed water reducible resin vehicles of the following types: polyester, nitrile, acrylic, vinyl, amino, polycarboxylic acid, phenolic, epoxy, modified oil, latex resin systems, copolymer and interpolymer resin systems, and emulsion resin systems. The preferred water reducible resin vehicles for use in this invention are an alkyd resin or polyester resin, a modified oil resin, or an acrylic resin system.

The amount of water reducible resin vehicle in the composition of this invention should be within the range of about 10% up to about 75% by weight of the composition, and preferably it should be maintained within the range of about 15% to about 40% by weight of the composition. This percent by weight of the water reducible resin vehicle is based on the resin solids in the composition.

The solvent material for use in the composition of this invention may be any number of different materials. For example, the solvent may be ethylene glycol mono butyl ether, isobutanol, various glycol ethers, various other ether materials, and various alcohol materials. Numerous other solvents are also set forth in the patent references immediately above. In certain instances, the compositions of this invention do not require any solvent material, such as for example, certain water reducible resin vehicles for use herein can be solubilized in the water based composition by converting the resin vehicle to its salt form through the use of an amine type material such as ammonia which reacts with the resin vehicle to convert it to a salt which is soluble in the water based composition without the requirement of any specific solvent material. Thus, the solvent material for use in the composition of the invention may be present within the range of about zero up to about 45% by weight of the composition, however preferably the solvent material is present within the range of about 2% to about 15% by weight of the composition.

The composition of the invention may be pigmented or unpigmented. Preferably however, the inventive composition is pigmented and may contain pigment broadly within the range of about 4% to about 55% by weight of the composition. More particularly when the composition of the invention is pigmented the pigment is normally present within the range of about 9% up to about 42% by weight of the composition. The pigment to resin or the pigment to resin binder weight ratio used in the composition herein is normally maintained within the range of about 1:20 to about 4:1 pigment to binder, ratio by weight.

The pH range for the composition of the invention prior to application as a coating should be maintained above 7.5 such that the composition is basic, and preferably the pH of the composition should be maintained within the range of about 8¼ to about 10.

The method of coating oily surfaces with the water reducible paint composition of this invention is unique in that the method of this invention enables, for example, the hot substrate surface of an engine which has been just removed from a test stand and which possesses an oily substrate surface having a temperature of approximately 70° C.–95° C. to be painted with formation of an adherent coating even though the substrate surface is at the elevated temperature and possesses the oily surface, and moreover, the composition may be applied to a substrate surface at a temperature as low as the freezing point of water and at even somewhat lower temperatures. Such a method of painting oily surfaces with a water based composition to form an adherent coating has not been known in the past and it is believed to be highly desirable for commercial application. This method and the invention herein are also believed to be highly desirable and advantageous when viewed from the standpoint that the water based coating composition of this invention is considerably more desirable from an ecological or pollution control standpoint relative to its intended usage than are prior art compositions.

In order to further illustrate the invention the following examples are provided. It is to be understood however that the examples are included for illustrative purposes and are not intended to be limiting of the scope of the invention as set forth in the subjoined claims.

Example formulation procedure, in the presence of agitation, is to normally add water first, then any amine solubilizer material is added, then the resin material is added together with its solvent material, then any pigment material is added, and lastly the driers and final letdown water or additional desired solvents are added. Application of the paints may be made by spraying, brushing, dipping, roller-coating, or electro-static spraying; and, curing of the applied paint is carried out by air-drying or baking (e.g., 60° C. to 360° C. for about 1–2 to about 180 minutes) as convenient to the particular resin vehicle being used.

| | | | Parts by weight | | | | |
|---|---|---|---|---|---|---|---|
| Ex. No. | Solubilizer (ammonia 26° Baumé) | Driers | Additive | Resin vehicle | Solvent material, butyl-Cellosolve | Pigment | Water |
| 1 | 17.0 | 7.0 (Mn Ten Cem Co Ten Cem). | 5.0 (DMP)¹ | 310.96 alkyd resin (RJ-7387) (linseed oil trimethylol ethane-isophthalic acid-trimellitic anhydride type alkyd). | 77.74 | 83.0 (molybdate range-red iron oxide-TiO₂). | 410.6 |
| 2 | ² 17.0 | 6.0 (2:Mn Ten Cem; 4:Ca Ten Cem). | 10.0 (DMP) | 310.96 alkyd resin (RJ-7356) (linseed fatty acid-trimethylol ethane- isophathalic acid-TMA). | 77.74 | 61.0 (45:moly orange, 9:toluidine red light, 5:TiO₂, 2:red iron oxide). | 400.0 |
| 3 | 16.0 | 9.0 (2:Mn Ten Cem, 2:Ph Ten Cem, 3:Co Ten Cem, 2:Ca Ten Cem). | 5.0 (DMP) | 180.0 styrenated oil-maleic anhydride adduct resin (RJ-9772). | 31.0 | 219.5 (50:TiO₂, 1.5: ferrite yellow, 8:carbon black, 160:aluminum silicate). | 524.0 |
| 4 | 15.0 | | Same as Ex. 1. | 260.0 polyester resin (RJ-4644), 52.0 Cymel-300 (melamine resin) American Cyanimid Co. | 60.0 | 250.0 TiO₂ | 425.0 |

TABLE—Continued

| Ex. No. | Solubilizer (ammonia 26° Baumé) | Driers | Additive | Resin vehicle | Solvent material, butyl-Cellosolve | Pigment | Water |
|---|---|---|---|---|---|---|---|
| 5 | | | 10.0 (DMP) | 270.0 Bakelite water-soluble acrylic resin No. 200 (Union Carbide Co.), 67.5 Cymel-300. | 80.0 | 300.0 TiO$_2$ | 410.0 |
| 6 | | | 10.0 (DMP) | 100.0 vinyl latex resin Everflex-MA (W.R. Grace Co.), 50% solids—13.0 surfactant, 15.0 dibutyl phthalate, 6.0 hydroxy ethylcellulose, 2.0 Dowicide A (preservative), 3.0 Nilfoam 7. | | 450.0 (120:TiO$_2$, 120:Ca CO$_3$, 110:clay, 100: talc). | 567.0 |
| 7 | Same as Ex. 6 but use 100 parts by weight of acrylic latex resin (Rohn & Haas 388), 50% solids. | | | | | | |
| 8 | Same as in Ex. 6 but use 100 parts by weight of Dow styrene-butadiene latex resin No. QX-3822 (48% solids). | | | | | | |
| 9 | Same as in Ex. 6 but use 100 parts of butadiene-acrylonitrile acrylate terpolymer latex resin, Ucar-860 (Union Carbide). | | | | | | |
| 10 | Same as in Ex. 1 but replace 110 parts by weight solids of the Ex. 1 resin with 110 parts solids basis phenolic resin emulsion CKU-2266 (Union Carbide Co.). | | | | | | |
| 11 | | | 10.0 (DMP) | 134.5 epoxy resin emulsion Araldite[3] X-8357/100 (65% solids), 132.0 LEC-2211 shellac emulsion (Gillespie-Rogers-Pyatt Co., Inc.), 1.5 tetra-sodium pyrophoshate dispersant. | | 500.0 (150:brown iron oxide, 50:barytes, 200: silica, 100:MgSiO$_2$). | 485.5 |
| 12 | Same formulation as in Ex. 1 but use the additive 1,1,3-trimethoxypropane. | | | | | | |
| 13 | Same formulation as in Ex. 2 but use the additive methyl dimethoxyacetate. | | | | | | |
| 14 | Same formulation as in Ex. 3 but use the additive 2,2-diethoxypropane. | | | | | | |
| 15 | Same formulation as in Ex. 4 but use the additive dimethoxymethane. | | | | | | |
| 16 | Same formulation as in Ex. 5 but use the additive 1,1,3-trimethoxy-3-ethoxypropane. | | | | | | |
| 17 | Same formulation as in Ex. 1 but use the additive 1,1,3-trimethoxypropene. | | | | | | |
| 18 | Same formulation as in Ex. 2 but use the additive 1,1-dimethoxytrimethylamine. | | | | | | |
| 19 | Same formulation as in Ex. 3 but use the additive 1,3,3-trimethoxypropene. | | | | | | |
| 20 | Same formulation as in Ex. 4 but use the additive 2,2-diallyloxypropane. | | | | | | |
| 21 | Same formulation as in Ex. 5 but use the additive 1,1,3,3-tetraethoxypropane. | | | | | | |
| 22 | Same formulation as in Ex. 6 but use the additive 4,4-dimethoxy-2-butanone. | | | | | | |
| 23 | Same formulation as in Ex. 1 but use the additive 1,2-di ethoxyethane. | | | | | | |
| 24 | Same formulation as in Ex. 2 but use the additive 1,1-dimethoxyethane. | | | | | | |

[1] 2,2-dimethoxypropane.
[2] L-17-31.
[3] Bake final paint 10 minutes at 400° F.

The solubilizer used herein may be any number of different materials such as ammonia or various other amine type solubilizers (triethanol amine, monoethanol amine, etc.). Ammonia is quite often used for economy.

The driers used herein also may be selected from a number of different types of commercially available driers, such as the Ten-Cem type available from Mooney Chemical Company.

The resin vehicle of Example 1 is:

| | PBW |
|---|---|
| Linseed oil | 31.6 |
| Trimethylol ethane (TME) | 20.8 |
| Isophthalic Acid 85% (IPA) | 31.3 |
| Trimetallitic anhydride (TMA) | 5.2 |

The resin vehicle of Example 2 is:

| | PBW |
|---|---|
| Linseed fatty acid | 52.1 |
| TME | 15.2 |
| IPA | 29.8 |
| TMA | 6.5 |

The resin vehicle of Example 3 is:

| | PBW |
|---|---|
| Linseed oil | 51.0 |
| Maleic anhydride | 9.0 |
| Styrene | 36.0 |

The resin vehicle of Example 4 is:

| | PBW |
|---|---|
| Neopentyl glycol | 27.2 |
| TME | 18.4 |
| IPA 95% | 18.6 |
| Azelaic acid—1133 | 21.4 |
| TMA | 14.4 |

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. A water based coating composition having a basic pH above about 7.5.
said composition comprising in effective amounts in weight percent:
   (a) about 0.05% to about 5% additive material of at least one $C_3$–$C_{11}$ polyalkoxy compound,
   (b) about 10% to about 75%, based on resin solids, of water reducible resin vehicle,
   (c) zero to about 45% solvent material for dissolving the resin vehicle,
   (d) and balance water.

2. The composition of claim 1 wherein, said alkoxy compound is comprised of $C_4$–$C_8$ polyalkoxy compound.

3. The composition of claim 1 wherein, said alkoxy compound is selected from at least one of the group consisting of dimethoxymethane, 1,1,3-trimethoxy-3-ethoxypropane; 1,1,3-trimethoxypropene; 1,1,3 - trimethoxypropane, 1,1 - dimethoxytrimethylamine, 1,3,3 - trimethoxypropene; methyl dimethoxyacetate, 2,2-diallyloxypropane, 2,2-diethoxypropane, 1,1,3,3-tetraethoxypropane, 4,4-dimethoxy - 2 - butanone, 1,2 - dimethoxyethane, 1,1 - dimethoxyethane, and 2,2-dimethoxypropane.

4. A composition as in claim 1 wherein,
component (a) is present from about 0.1% to about 1.5%.
component (b) is present from about 15% to about 40%,
component (c) is present from about 2% to about 15%.

5. A composition as in claim 1 wherein, said water reducible resin is comprised of polyester resin.

6. A composition as in claim 1 wherein, said pH is between about 8¼ and about 10.

7. A composition as in claim 1 wherein, said composition additionally includes a pigment, present in an amount between about 4% and about 55% by weight of the composition.

8. A composition as in claim 7 wherein, said alkoxy compound is comprised of $C_4$–$C_8$ polyalkoxy compound.

9. A composition as in claim 7 wherein, said alkoxy compound is selected from at least one of the group consisting of dimethoxymethane, 1,1,3 - trimethoxy - 3-ethoxypropane, 1,1,3 - trimethoxypropene, 1,1,3 - trimethoxypropane, 1,1 - dimethoxytrimethylamine, 1,3,3 - trimethoxypropene, methyl dimethoxyacetate, 2,2 - diallyloxypropane, 2,2 - diethoxypropane, 1,1,3,3 - tetraethoxypropane, 4,4-dimethoxy - 2 - butanone, 1,2 - dimethoxyethane, 1,1-dimethoxyethane, and 2,2-dimethoxypropane.

10. A composition as in claim 7 wherein, said alkoxy compound is selected from at least one of the group consisting of 1,1,3 - trimethoxypropane, methyl dimethoxyacetate, 2,2-diethoxypropane, and 2,2-dimethoxypropane.

11. A composition as in claim 7 wherein, said alkoxy compound is comprised of 2,2-dimethoxypropane.

12. A water based coating composition having a basic pH above about 7.5
said composition comprising in effective amounts in weight percent:
(a) about 0.05% to about 5% additive material of at least one $C_3$–$C_{11}$ polyalkoxy compound,
(b) about 10% to about 75%, based on resin solids, of water reducible resin vehicle,
(c) zero to about 45% solvent material for dissolving the resin vehicle,
(d) and balance water, and wherein,
said alkoxy compound is selected from at least one of the group consisting of 1,1,3-trimethoxypropane, methyl dimethoxyacetate, 2,2-diethoxypropane, and 2,2-dimethoxypropane.

13. The composition of claim 12 wherein, said alkoxy compound is comprised of 2,2-dimethoxypropane.

14. A water based composition having a basic pH above about 7.5.
said composition comprising in effective amounts in weight percent:
(a) about 0.05% to about 5% additive material of at least one $C_3$–$C_{11}$ polyalkoxy compound,
(b) about 10% to about 75%, based on resin solids, of water reducible resin vehicle, selected from at least one of the group consisting of a polyester resin, vinyl resin, amino resin, epoxy resin, oil modified resin, nitrile resin, phenolic resin, and polycarboxylic acid resin,
(c) about 2% to about 45% solvent material for dissolving the resin vehicle,
(d) and balance water.

15. A composition as in claim 14 wherein, said composition additionally includes a pigment, present in an amount between about 1:20 and about 4:1, pigment to resin binder weight ratio.

16. A composition as in claim 14 wherein, said water reducible resin is comprised of polyester resin.

17. A water based coating composition having a basic pH above about 7.5
said composition comprising in effective amounts in weight percent:
(a) about 0.05% to about 5% additive material of at least one $C_3$–$C_{11}$ polyalkoxy compound,
(b) about 10% to about 75%, based on resin solids, of water reducible resin vehicle, selected from at least one of the group consisting of a polyester resin, vinyl resin, amino resin, epoxy resin, oil modified resin, nitrile resin, phenolic resin, and polycarboxylic acid resin,
(c) about 2% to about 45% solvent material for dissolving the resin vehicle,
(d) and balance water, and wherein,
said alkoxy compound is selected from at least one of the group consisting of 1,1,3-trimethoxypropane; methyl dimethoxyacetate; 2,2-diethoxypropane; and 2,2-dimethoxypropane.

18. The compsition of claim 17 wherein, said alkoxy compound is comprised of 2,2-dimethoxypropane.

19. A method of coating oily or greasy substrate surfaces to form an adherent coating thereon, said method being comprised of applying to the substrate surface, which is maintained at a temperature below about 95° C., a coating composition, having a pH of about 7.5 and higher, comprising in weight percent: (a) about 0.05% to about 5% additive material means of at least one $C_3$–$C_{11}$ polyalkoxy compound for altering relative surface tension characteristics present in the water based coating composition and oily material as the coating is applied to the substrate and operative to enable said coating composition to be adherently applied to the substrate surface, (b) about 10% to about 75%, based on resin solids, of water reducible resin vehicle, (c) zero to about 45% solvent material for dissolving the resin vehicle, (d) and balance water.

20. A method of coating oily or greasy substrate surfaces to form an adherent coating thereon, said method being comprised of applying to the substrate surface, which is maintained at a temperature below about 95° C., a coating composition, having a pH of about 7.5 and higher, comprising in weight percent: (a) about 0.05% to about 5% additive material means of at least one $C_3$–$C_{11}$ rheological additive compound for altering relative surface tension characteristics present in the water based coating composition and oily material as the coating is applied to the substrate and operative to enable said coating composition to be adherently applied to the substrate surface, (b) about 10% to about 75%, based on resin solids, of water reducible resin vehicle, (c) zero to about 45% solvent material for dissolving the resin vehicle, (d) and balance water, and wherein, said compound is comprised of at least one $C_4$–$C_8$ polyalkoxy compound.

21. A method of coating oily or greasy substrate surfaces to form an adherent coating thereon, said method being comprised of applying to the substrate surface, which is maintained at a temperature below about 95° C., a coating composition, having a pH of about 7.5 and higher, comprising in weight percent: (a) about 0.05% to about 5% additive material means of at least one $C_3$–$C_{11}$ rheological additive compound for altering relative surface tension characteristics present in the water based coating composition and oily material as the coating is applied to the substrate and operative to enable said coating composition to be adherently applied to the substrate surface, (b) about 10% to about 75%, based on resin solids, of water reducible resin vehicle, (c) zero to about 45% solvent material for dissolving the resin vehicle, (d) and balance water, and wherein, said compound is comprised of 2,2-dimethoxypropane.

References Cited
UNITED STATES PATENTS

| | | | |
|---|---|---|---|
| 2,945,831 | 7/1960 | Evans et al. | 260—29.2 R |
| 2,716,095 | 8/1955 | Stanton et al. | 260—45.7 R |
| 2,976,328 | 3/1961 | Bowman | 260—615 |
| 2,991,184 | 7/1961 | Bernardi et al. | 106—30 |
| 3,218,359 | 11/1965 | Aguadisch | 260—614 |
| 3,282,874 | 11/1966 | Friedrich et al. | 260—29.2 R |
| 3,376,252 | 4/1968 | Peiser et al. | 260—45.7 |
| 3,439,064 | 4/1969 | Makowski et al. | 260—879 |

DONALD E. CZAJA, Primary Examiner

R. W. GRIFFIN, Assistant Examiner

U.S. Cl. X.R.

117—132 R, 132 BE, 132 BF, 161 R, 161 K, 161 L, 161 UN, 161 UZ, 161 ZB; 260—29.2 R, 29.2 UA, 29.2 E, 29.2 EP, 29.2 N, 29.3, 29.4 R, 33.2 EP, 33.2 R

UNITED STATES PATENT OFFICE
CERTIFICATE OF CORRECTION

Patent No. 3,761,433      Dated September 25, 1973

Inventor(s) Gerald Stanfield High

It is certified that error appears in the above-identified patent and that said Letters Patent are hereby corrected as shown below:

Column 2, line 5, "3,439,604" should be --3,439,064--.

Column 2, line 20, "specially" should be --specifically--.

Column 2, line 22, "struck" should be --truck--.

Column 2, line 38, after "invention" insert --is--.

Column 2, line 69, "dimethxyethane" should be --dimethoxyethane--.

Column 3, line 36, "shonld" should be --should--.

Page 2, Parts by Weight, Example 1, Column 7, "range" should be --orange--.

Page 3, Example 23, where blank occurs insert --m--.

Page 3, second footnote, "L-17-31" should be --L-71-31--.

Column 6, line 51, "propane;" should be --propane,--.

Column 6, line 53, "propene;" should be --propene,--.

Column 7, line 74, "compsition" should be --composition--.

Signed and sealed this 21st day of May 1974.

(SEAL)
Attest:

EDWARD M.FLETCHER,JR.
Attesting Officer

C. MARSHALL DANN
Commissioner of Patents

FORM PO-1050 (10-69)